(12) United States Patent
Hagerott et al.

(10) Patent No.: US 9,193,439 B2
(45) Date of Patent: Nov. 24, 2015

(54) REVERSIBLE FLIGHT CONTROL SYSTEMS

(71) Applicant: Cessna Aircraft Company, Wichita, KS (US)

(72) Inventors: Steven G. Hagerott, Wichita, KS (US); Stephen Eddy, Derby, KS (US); Jeremy Phillip Taylor, Bel Aire, KS (US)

(73) Assignee: Textron Innovations, Inc., Providence, RI (US)

( * ) Notice: Subject to any disclaimer, the term of this patent is extended or adjusted under 35 U.S.C. 154(b) by 0 days.

(21) Appl. No.: 14/195,419

(22) Filed: Mar. 3, 2014

(65) Prior Publication Data

US 2014/0263848 A1 Sep. 18, 2014

Related U.S. Application Data

(60) Provisional application No. 61/785,876, filed on Mar. 14, 2013.

(51) Int. Cl.
*B64C 13/30* (2006.01)
*B64C 13/46* (2006.01)

(52) U.S. Cl.
CPC *B64C 13/30* (2013.01); *B64C 13/46* (2013.01)

(58) Field of Classification Search
CPC ........ B64C 13/50; B64C 13/46; B64C 13/40; B64C 13/38; B64C 13/30; B64C 13/28; B64C 13/04
See application file for complete search history.

(56) References Cited

U.S. PATENT DOCUMENTS

| | | | |
|---|---|---|---|
| 4,664,346 A * | 5/1987 | Koenig | 244/223 |
| 4,758,958 A * | 7/1988 | von Gersdorff | 701/4 |
| 7,984,880 B2 | 7/2011 | Gomes | |
| 8,376,283 B2 * | 2/2013 | Grieser | 244/178 |

* cited by examiner

*Primary Examiner* — Tien Dinh
*Assistant Examiner* — Richard R Green
(74) *Attorney, Agent, or Firm* — Lathrop & Gage LLP

(57) ABSTRACT

An improved flight control system is described, providing for increased or reduced pilot input forces necessary to cause desired control surface deflections.

28 Claims, 8 Drawing Sheets

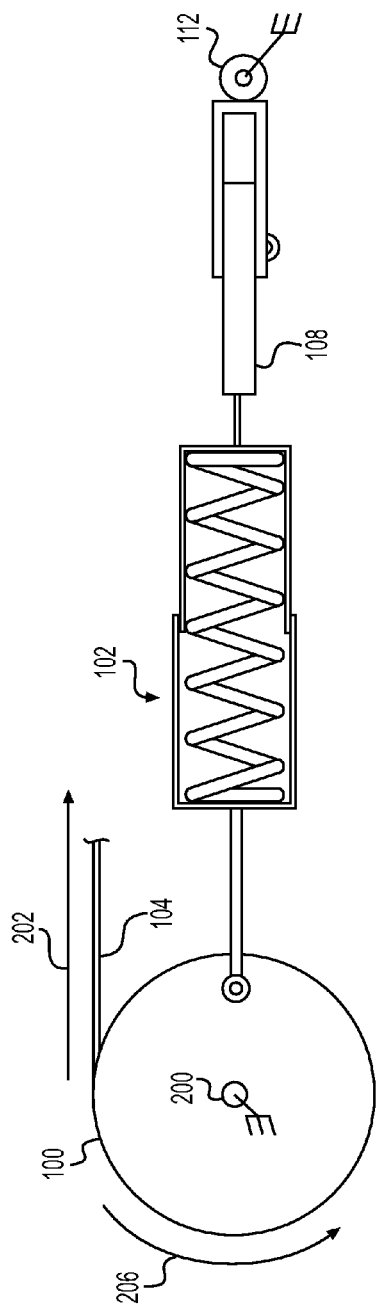
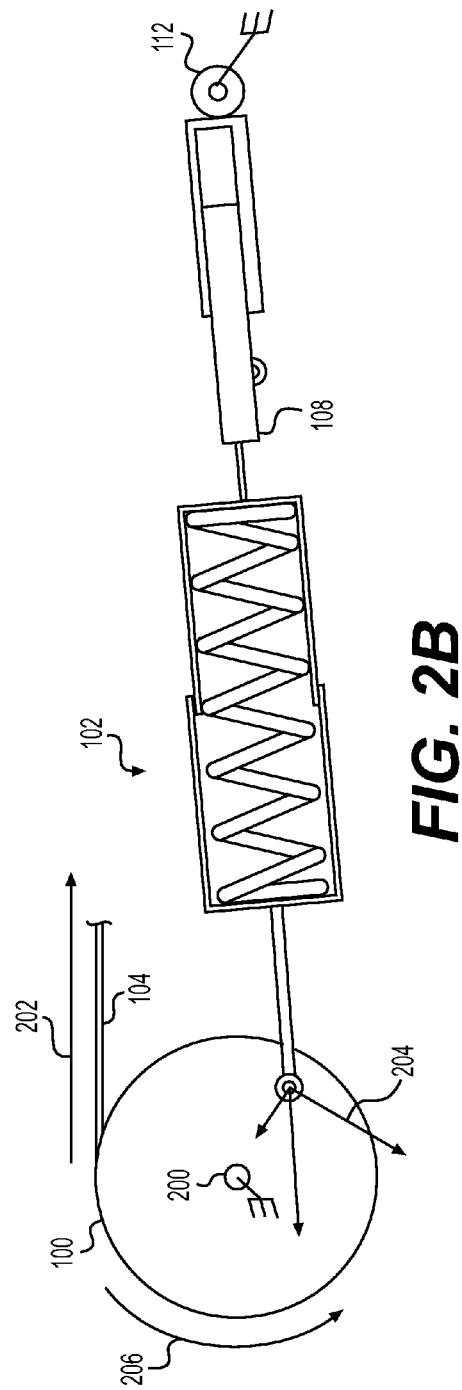
FIG. 2A
FIG. 2B

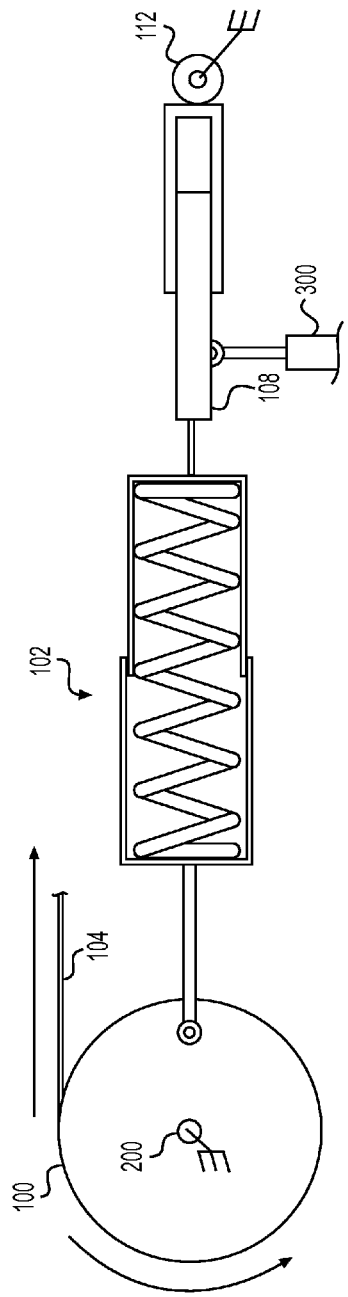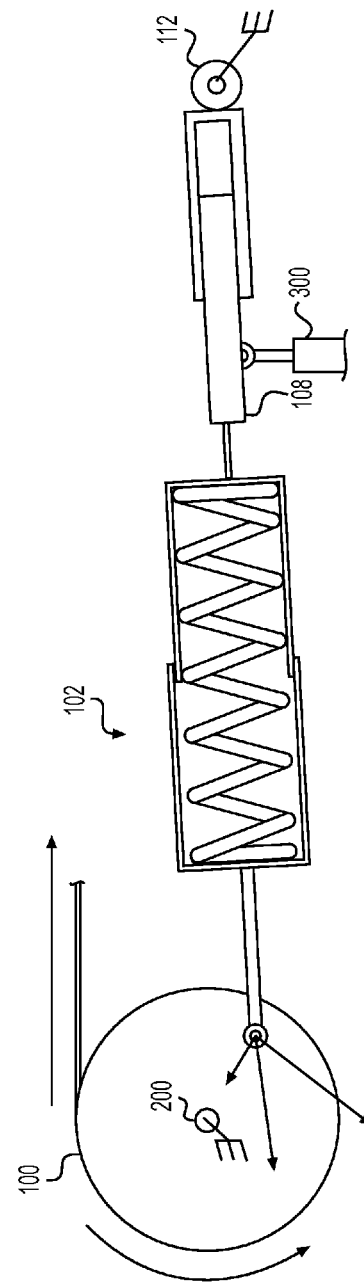

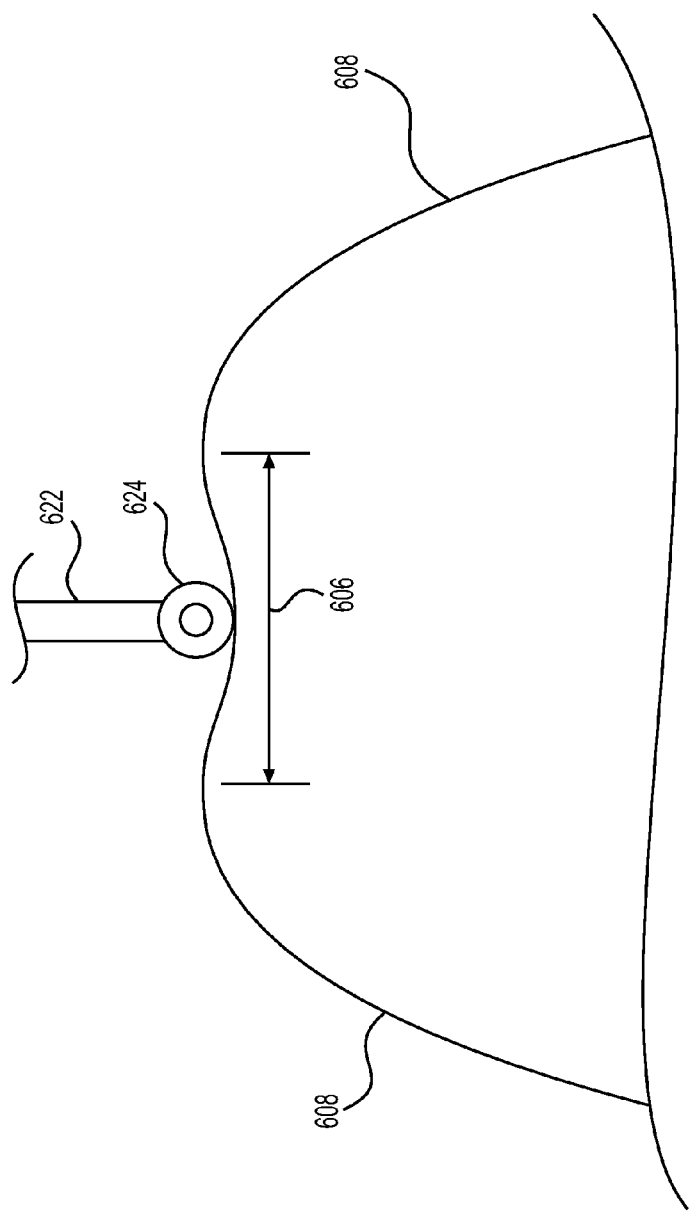

REVERSIBLE FLIGHT CONTROL SYSTEMS

RELATED APPLICATION

This application claims the benefit of U.S. Provisional Patent Application Ser. No. 61/785,876 filed Mar. 14, 2013, the disclosure of which is incorporated herein by reference.

BACKGROUND

Field of the Invention

Generally, the disclosed system relates to aircraft control systems and devices. More specifically, the disclosed system relates to systems and devices for modifying the control forces felt by the pilot of an aircraft.

SUMMARY

A system and method is disclosed to apply an over-centered spring to a control sector within a flight control system to modify the control forces experienced by the pilot when moving the aircraft flight control surface connected to the control sector. The over-centered spring has a scheduled preload compression or tension applied to it so that it offers a control force reduction or stiffening to the system. The preload settings and the trim of the over-centered spring may be modified by actuators in the system. Given the force requirements to meet certification for pilot effort in operating the control, this allows alternate control inceptors to be used in the aircraft for varying aerodynamic and flight parameters or circumstances, including without limitation, airspeed, mach number, horizontal tail trim angle, aircraft center of gravity, sideslip and load factor or angle of attack.

An over-centered spring is applied to a pivoting mechanism within a flight control system (hereafter called a sector, but not limited to a sector). The over-centered spring operates under a tension or compression preload. In an embodiment, the spring and sector are mechanically arranged such that the sector axis is in between the spring's attachment point to the airframe and the spring's attachment point on the sector. In this embodiment, the typical operation would be to provide a tension preload such that motion of the pivoting mechanism from the trim position causes the spring to impart a load to the mechanism away from center. In this configuration the system reduces the force required from the pilot for a given control input. In other configurations the system may increase the required force for a given control input. In other configurations the spring's attachment point to the control sector is disposed between the control sector's attachment point to the airframe and the spring's attachment point to the airframe. In this configuration a compression preload on the spring would reduce the force required from the pilot, while a tension preload on the spring would reduce the force required from the pilot.

In another embodiment, an optional centering device is added to tailor the degree of force reduction near zero. This allows small deflection stability where the aerodynamic forces near zero deflection, as caused by interactions with the flow boundary layer, are notably lower than non-zero surface deflections. The centering device resists motion of the attached arm within a specified breakout force. This device can be implemented as a pair of low stiffness, preloaded springs. Due to the low stiffness, additional force is not imparted by the centering device as it is further compressed by position deviations off of center.

In the case of a flight control system with aerodynamic forces operating on the control surface when it is deflected from its neutral position, the noted invention acts to either reduce or increase the control forces required from the pilot to move the control surface to a desired deflected position. The tension or compression preload is applied via an actuator to the mounting point of the spring so that the amount of control force reduction can be scheduled with aircraft parameters, such as, but not limited to: flap position, horizontal tail position, airspeed, Mach number, or load factor. This would ensure that the control forces are lightened at high speed, but not excessively lightened or even reversed, at low speed.

The mounting location for the spring on the airframe may be actuated on a separate pivot, or sector denoted herein as the preload actuator sector or preload control member, so that it can be moved to match a varying flight control system trim position. The movement of the preload actuator sector affects the relationship of the axes of the sector pivot axis and the preloaded spring attachment, as described below in relation to FIG. 1. Movement of this sector and the preloaded spring attachment moves the position of zero force reduction away from the initial center of the control sector to match the trim position of the control surface. As described below with reference to the Figures, movement of the preload actuator sector would shift the position of zero force reduction by the device to occur at a non-zero position. In another embodiment, the attachment point of the preload actuator may be fixed. This results in a system where the minimum value of the load applied by the spring to the flight control system occurs at the same flight control deflection position.

In one embodiment the spring is placed in a compression preload and the control forces seen by the pilot are increased from their aerodynamically driven values. In other embodiments the spring is placed in a tension preload and forces felt by the pilot are also increased from the forces generated by aerodynamic pressure. In some embodiments, the spring is adjusted from a compression preload to a tension preload, or vice versa, during flight.

The control of the spring preload is accomplished in one embodiment via a control circuit that controls an actuator position based on input airspeed. The control circuit is tuned such that the actuator is driven to a particular position that is scheduled with airspeed. An alternate embodiment controls the spring preload by a mechanism that is driven by the flap position, airspeed, Mach number, load factor, or horizontal tail trim angle position, either the moveable stabilizer or the trim tab actuator length.

To mitigate the impact of failures, such as jams, the authority of the device is limited so that it does not provide excessive authority at low speed if the actuator is jammed in the high speed position. In other embodiments, jam detection and prevention may be provided by a comparison of the actual actuator position and the scheduled position. If the two values differ substantially a jam or malfunction may be indicated. If a jam or a malfunction is detected by the comparison or another method, a mechanical disconnect may be provided to uncouple the spring from the control system of the aircraft. Separate mechanisms can be used to provide the necessary availability and jam protection for CFR Part 25 elevator and aileron systems.

In an additional embodiment, a damper cartridge may be provided in parallel with the spring to allow the damping ratio of the applied force to be tuned.

BRIEF DESCRIPTION OF THE DRAWINGS

FIG. 2A is a schematic view of an embodiment of the improvement to flight control systems.

FIG. 2B is a schematic view of an embodiment of the improvement to flight control systems.

FIG. 3A is a schematic view of an embodiment of the improvement to flight control systems.

FIG. 3B is a schematic view of an embodiment of the improvement to flight control systems.

FIG. 6C is a detail schematic view of a portion of an embodiment of the improvement to flight control systems.

DETAILED DESCRIPTION

It may be desired to modify the control forces experienced by the pilot of an aircraft when operating the flight controls, including without limitation the rudder, ailerons or elevators. The control forces are typically the result of aerodynamic pressures on the control surfaces of the aircraft, and the mechanical forces arising within the mechanical linkages between the pilot and the control surface, such as friction between system components. These forces are experienced by the pilot as a force that resists the movement of the flight controls and increases the force that must be exerted on the control stick by the pilot to achieve and maintain a desired control surface deflection or actuation.

The control forces may be modified by various techniques to increase or decrease the force that a pilot must apply to cause a desired control input. Depending on various factors, such as the speed of the aircraft, it may be desirable to reduce the force a pilot need apply for a given control input. In other situations it may be desirable to increase the force a pilot needs to apply for the same control input. One such method is to use an over-centered spring to apply additional forces to the control system of the aircraft, either to counteract the aerodynamic forces on the control surfaces of the airplane or to oppose control input from the pilot. The improved control system described herein includes an augmentation system to augment the other forces felt by the pilot, and to either increase or decrease the force that must be exerted by a pilot to cause a desired control surface deflection.

An over-centered spring comprises a spring that is under tension or compression and attached to the system in relation to the pivot point of an axis of rotation or movement of some portion of the control system. When in the over-centered position the spring does not exert any force on the control system of the aircraft, but when the spring is moved to an off-center position it begins to exert force on the control system in a desired manner. The spring may be either an extension spring that resists extension, or a compression spring that resists compression. The type of spring combined with the location of the spring attachment to the control system of the aircraft will determine if the spring reduces or increases the control force necessary from the pilot.

Figure 1:
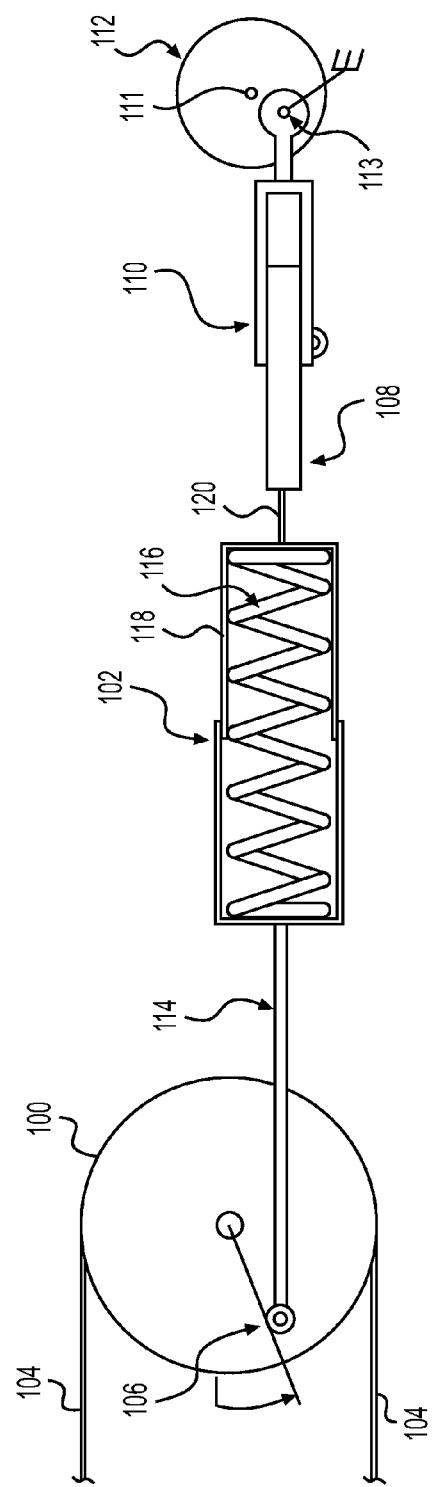
FIG. 1 is a schematic view of an embodiment of the improvement to flight control systems.

Referring now to FIG. 1, an example of an over-center spring system is depicted. Control sector, or control input member, 100 is provided for translating pilot input to a control surface. The control sector 100 is connected to both the control surfaces of the aircraft and to the pilot control interceptor. In the depicted embodiment cables 104 are depicted variously as connecting to the control surfaces and to the pilot control interceptor. In other embodiments the control sector may be connected to either by various other mechanical connections such as torque tubes, rods, or other methods of transferring the force from the pilot control interceptor to the desired control surface as are known for use in aircraft. A spring assembly 102 is attached at one end 106 to the control sector 100, and may be under tension or compression. The other end 108 of spring assembly 102 is attached to a preload actuator 110 for adjusting the tension or compression of spring 102. The pilot may rotate control sector 100 by applying force to the control cable 104. In an embodiment, cables 104 may be provided on both sides of sector 100 to allow the pilot to rotate the sector 100 in both directions. In other embodiments the control sector 100 may be replaced by a bellcrank or other similar means of providing pilot control input to a control surfaces of the aircraft.

The spring assembly 102 comprises a spring 116 and spring support, or case or cylinder 118. Spring support 118 may contain spring 116 or may be disposed within spring 116, such as a rod or piston disposed within spring 116. One end of spring support 118 is attached to preload actuator 110. The other end of spring support 118 is attached to control sector 100 by spring arm 114, which is pivotally connected to the control sector 100. The length of spring assembly 102 varies as spring 116 expands and contracts due to the movement of preload actuator 110 and control sector 100. Spring support 118 extends as necessary to allow the spring assembly 102 to extend or compress. Spring assembly 102 may also be provided with a second spring arm 120 for connecting the preload actuator to the spring support 118. In the embodiment depicted in FIG. 1 the axis of rotation of the control sector is between the mount point of the spring arm to the control sector and the mount point of the preload actuator 110 to the airframe. In other embodiments the mount point of the spring arm to the control sector may be between the axis of rotation of the control sector and the mount point of the preload actuator to the airframe.

The preload actuator 110 is pivotally attached at a preload actuator mount point to the frame of the aircraft or to a preload actuator sector, or trim control, 112 that is attached to the aircraft. FIG. 1 depicts the preload actuator sector 112 with the preload actuator 110 pivotally attached thereto at point 113. The preload actuator sector 112 is rotatably attached to the airframe of the aircraft at a trim mount point 111. Although not expressly depicted in the other figures, all other embodiments of the system shown in the figures may have either the preload actuator sector 112 as shown in FIG. 1, or have a direct pivotal attachment to the airframe of the aircraft at point 112 or 620. The off-center mount point 113 allows the system to be adjusted so that the neutral trim point of the over-centered spring matches the trim point of control sector 100 and the point of zero force occurs in the trimmed position. Preload actuator sector 112 allows the neutral over-center position of spring 102 to be adjusted by moving the mount point 113 in a circle, which has a component of side-to-side movement. Other methods of moving mount point 113 from side to side to adjust for a trim point may be utilized, such as mounting points for the preload actuator 110 that may be slidably moved along a track disposed generally perpendicular to the length of the spring arm. Preload actuator sector 112 may be a sector rotatably attached to the aircraft frame or some other device such as a bellcrank pivotally attached thereto. This side-to-side movement of the mount point 113 allows the over-center position to be adjusted as necessary to compensate for rotation of the control sector 100 for aircraft trim and other requirements.

Preload actuator 110 may be extended or retracted to alter the preload of tension or compression on spring 102. The position of the preload actuator may be scheduled based on airspeed, angle of attack, horizontal tail trim angle position, or other aircraft performance parameters or other aircraft control surface settings. The preload actuator 110 may be used to alter the preloaded tension or compression on spring 102, and also alter the spring from compression to tension during flight, and vice versa. The alteration in the position of the preload actuator provides a proportional change in the hinge moments of the control surfaces which can be either positive or negative as desired.

The alterations in force profile experienced by the pilot provide a number of benefits, including not only the increases and reductions in forces felt by the pilot, but regulation of the forces felt by and required of the pilot across the flight envelope resulting in improved consistency.

Modification of the pilot force profile based on airspeed may be proportional based on airspeed or scheduled throughout the airspeed range of the aircraft with improved performance on all axes of aircraft control. Pilot pitch forces, and inherent aircraft pitch stability, may reach a critical point in an aircraft's envelope across a small range of Mach numbers.

By scheduling the spring preload with Mach number, the pilot control forces and apparent aircraft stability may be improved to be more consistent across the aircraft flight envelope. Without the scheduling of spring preload based on Mach number, some aircraft configurations may experience inadequate pilot forces at some Mach numbers and pilot forces that are too great at other Mach numbers. Scheduling the spring preload based on Mach number allows pilot forces to be more consistent across the performance envelope without complex feedback augmentation systems.

An aircraft's center of gravity causes pilot pitch forces to vary significantly as the center of gravity moves between the forward and aft center of gravity limits. The horizontal tail trim angle position is indicative of the aircraft center of gravity. The trim angle may be used to schedule the spring preload for pitch control surfaces so that improve aircraft handling in the pitch axis and to maintain pilot pitch force per load factor within regulatory limits.

At certain load factors or angles of attack pilot forces may be reduced below acceptable levels, allowing the pilot to create undesirable large control surface deflections. The spring preload may be scheduled based on load factor or angle of attack to stiffen the control system in certain conditions to increase the apparent force felt by the pilot and maintain the system within regulatory limits.

When an aircraft in a high sideslip condition, the aircraft may encounter a situation known as rudder lock when rudder forces are reversed and a rudder may be locked at the maximum deflection and the pilot may be unable to recenter the rudder. This results from reduced natural hinge moment of the rudder in increasing sideslip condition. By scheduling the pilot forces for rudder deflection to increase with increasing sideslip the reduced natural hinge moment may be complemented by the spring preload and prevent large rudder deflections that may cause rudder lock.

The spring preload may be scheduled based on one or more of the foregoing parameters, or other parameters known to impact aircraft control surface performance.

FIG. 2A depicts the over-centered spring in a neutral position with no offset for aircraft trim settings. The linear axis of the spring 102 is arranged to be substantially in line (as close as possible) with the mount point or center of rotation 200 of control sector 100 and therefore, ideally, no rotational force (or nominal rotational force) is exerted by the spring 102 on the sector 100. This position typically is the configuration when the pilot is not providing any control input to the control surface. The spring preload force of spring 102 may be adjusted by extending or retracting spring preload actuator 108.

FIG. 2B depicts the over-centered spring in an off-centered position. Control sector 100 may be rotated by a force 202 applied by the pilot on control cable 104. The attachment point 200 rotates and the axis of spring 102 moves off-center and out of alignment with axis of rotation 200. In this configuration spring 102 exerts a rotational force 204 on the sector 100 that partially counteracts control surface force 206. If spring 102 is compressed, it exerts a force on sector 102 that complements the force 110 applied by the pilot. As a result the pilot must apply less force to achieve a desired control input than if the spring 102 was not present. Similarly, if spring 102 is under tension it will exert a force that is in opposition to the force 202 applied by the pilot and the pilot will need to exert a greater force to achieve a desired control input.

In the embodiments depicted in FIGS. 2A-3B, the mount point of the spring arm to the control sector is between the axis of rotation of the control sector and the mount point of the preload actuator 110 to the airframe.

Referring now to FIGS. 3A and 3B, an additional embodiment of the improved flight control system is depicted. The embodiment is provided with a centering device 300 for centering the spring and control sector. This device resists small deviations from the neutral position to add stability to the system. The centering device 300 may comprise of a pair of opposed low stiffness springs that resist extension or compression of the centering device. Other methods of implementing the centering device 300 may be provided for the flight control system.

Figure 4:
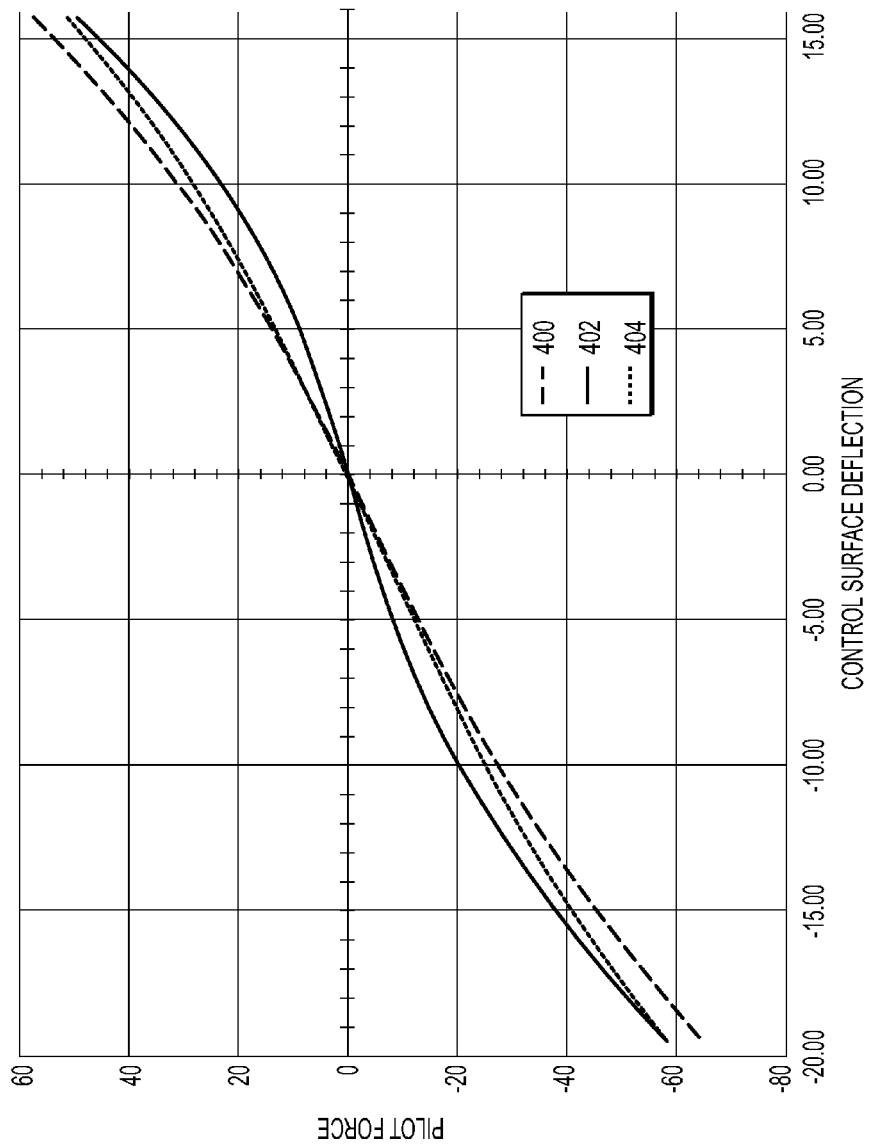
FIG. 4 is a graph depicting the relationship of pilot force to control surface deflection.

Referring now to FIG. 4, a graph depicting the relationship between the force applied by the pilot and the deflection of a control surface is provided for an embodiment where the spring preload assists the pilot by reducing the required force for a given control surface deflection. Graph 400 depicts the control force required without the improved flight control system described herein. The force required of the pilot increases substantially as the control surfaces are deflected further from their neutral position. These forces also increase with increasing aerodynamic forces caused, for example, by increasing airspeed or other environmental circumstances. With an embodiment of the improved flight control system the graph 402 depicts the reduced pilot force required for a given control surface deflection throughout the range of motion. Graph 404 depicts the force required from the pilot in the improved flight control system with the centering device, which counteracts the force reduction for small control surface deviations and then at higher control surface deviations the spring 102 provides force reductions for the pilot.

Figure 5A:
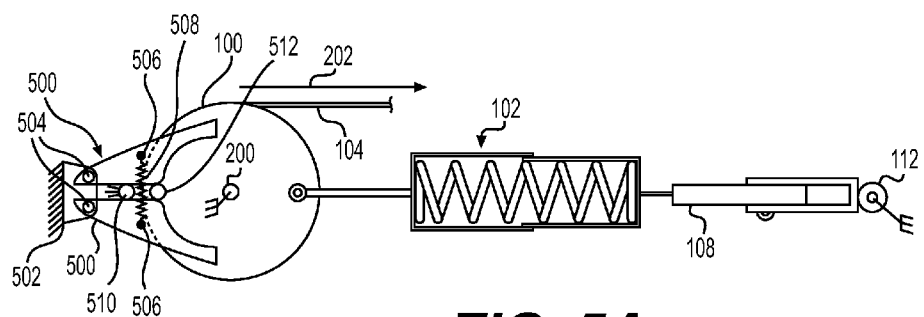
FIG. 5A is a schematic view of an embodiment of the improvement to flight control systems.
Figure 5B:
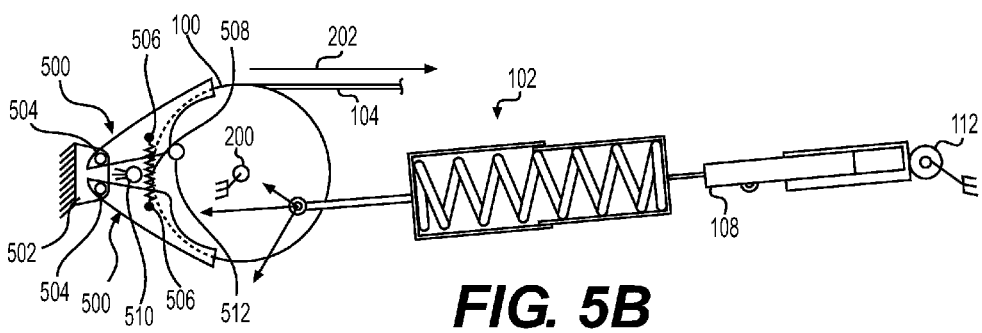
FIG. 5B is a schematic view of an embodiment of the improvement to flight control systems.
Figure 5C:
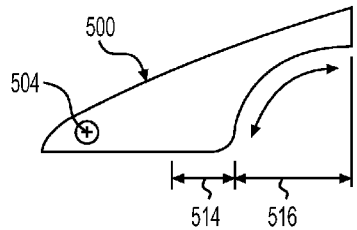
FIG. 5C is a schematic view of a portion of an embodiment of the improvement to flight control systems.

Referring now to FIGS. 5A, 5B and 5C, a schematic view of another embodiment of the improvement to flight control system is depicted. In the depicted embodiment, an alternative centering device is provided to resist small deviation changes in the position of control sector 100. Cams 500 are pivotally attached to the airframe 502 of the aircraft at pivot points 504. The two cams 500 are connected to each other at retention points 506 by spring 508. The spring 508 exerts a force on both cams 500 tending to pull the cams 500 toward each other. A pin 510 maintains the cams 500 at a neutral position. Pin 510 may be replaced with multiple pins, one or more brackets, or other structures that retain the two cams 500 in a neutral position. A follower 512 is provided attached to control sector 100 and is positioned between the lobes of cams 500.

As the control sector 100 is rotated by the pilot of the aircraft as shown FIG. 5B, follower 512 engages cams 500 to provide a centering force that urges the control sector 100 back toward the neutral position depicted in FIG. 5A. In the neutral position, little, if any, force is exerted by cams 500 on the follower 512 and the control sector 100. As the control sector 100 is rotated to a non-neutral position, as depicted in FIG. 5B, the follower 512 interacts with one of the cams 500 and causes that cam 500 to displace from the neutral position and away from the other cam 500 which is maintained in position by pin 510. As the cams are separated, spring 508 extends and exerts a force on cams 500 that tends to pull the cams 500 back to the neutral position. The cam 500 transfers that centering force to follower 512 which tends to oppose the rotation of control sector 100 and to return control sector 100 to a neutral position.

Referring now to FIG. 5C, the shape of the cam 500 in an embodiment of the improved control system is depicted. The depicted cam 500 engages follower 512 on a lobe that has a shape designed to create a force profile to assist the centering of the control sector 100. Other cam shapes may be provided to create a different desired force profile. Depending on the cam shape and configuration, the cams 500 may be used provide the desired force to assist or resist the pilot and to replace spring 102. In the depicted cam 500, as follower 512 initially displaces from the neutral position cam 500 exerts a rapidly increasing force against the displacement. This force is developed by the centering section 514 of cam 500. As follower 512 transitions from centering section 514 to non-centering section 516 the force exerted by cam 500 on follower 512 no longer increases but remains constant.

Figure 6A:
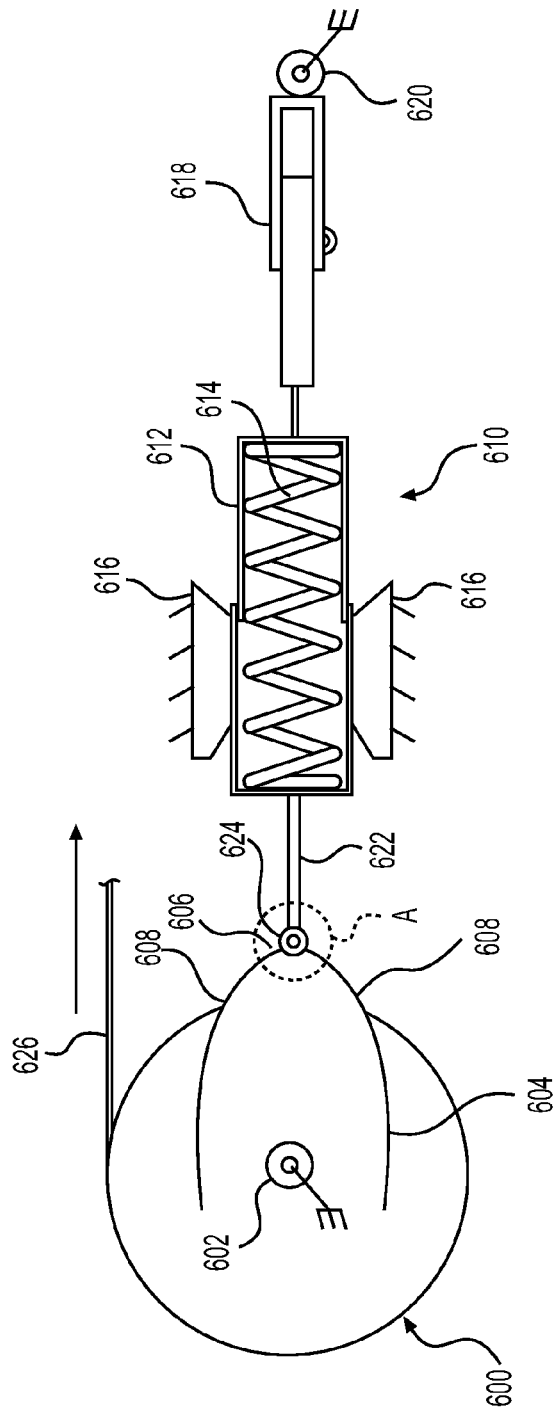
FIG. 6A is a schematic view of an embodiment of the improvement to flight control systems.

Referring now to FIG. 6A, a schematic view of an alternative embodiment of the improved control system is depicted. In the depicted embodiment, a cam is provided on the control sector to provide both a centering force in a narrow range of angular displacement from a neutral position and an augmenting force once the displacement has exceeded that narrow range. In FIG. 6A, the alternative embodiment is depicted in a neutral position that corresponds to the trim position of the control system.

Control sector, or control input member, 600 receives pilot input forces through control line 626, though in other embodiments this pilot force may be transferred through a variety of means of mechanically transferring the pilot's control force to a control surface of an aircraft. The control sector 600 is pivotally attached at point 602, also referred to as the control member mount point, to the airframe of an aircraft. Control sector 600 may be mounted at point 602 on a torque tube that is rotationally attached to the airframe, or some other part of the control system that is pivotally or rotationally mounted with respect to the airframe.

Cam 604 is attached to or formed as part of control sector 600. Cam 604 is fixedly attached to control sector 600 so that as control sector 600 pivots or rotates, cam 604 moves with it and rotates around point 602. Cam 600 is provided with a centering area 606 and augmentation areas 608 disposed on either side of centering area 606. Centering area 606 comprises a partially concave area of the surface of cam 604, and augmentation areas 608 are substantially convex or flat areas of the surface of cam 604. In some embodiments, cam 604 may be physically separated from control sector 600 but attached thereto by a torque tube or other rotational connection.

Spring arm assembly 610 provides both a centering and augmenting force to cam 604, and thus to the pilot operating the controls of the aircraft. The assembly 610 comprises a spring support 612 and spring 614 disposed within spring support 612. Spring support 612 may be configured in any way that supports spring 614 and allows it to compress or extend. In the embodiment depicted in FIG. 6A, the spring 614 is a compression spring.

A first end of spring support 612 is attached to a linear actuator 618. Linear actuator 618 is attached to the airframe of the aircraft at point 620. The linear actuator 618 may be extended or retracted to cause spring 614 to compress or extend as desired. The extension or compression of spring 614 allows the force applied by the spring arm assembly 610 to the control sector 600 to be modified as desired based on a variety of circumstances as described above with regard to other embodiments of the improved control system.

Spring support 612 is disposed within and slidably retained by a support sleeve or bracket 616 that is attached to the airframe of the aircraft. Spring support 616 provides support to spring assembly 610 to keep it oriented in the correct direction. Spring 614 and support 612 are slidably retained in the sleeve or bracket 616 to allow spring arm assembly to extend or retract and thus to allow spring 614 to exert force on cam 604. Sleeve or bracket 616 may comprise a single sleeve component or separate components that in combination hold spring arm assembly 610 in the desired orientation while allowing it to extend or retract.

A second end of spring support 612 is provided with a roller arm 622 which extends from spring assembly 610 to contact cam 604. A roller 624 is rotationally attached to the end of roller arm 622. Roller 624 is in contact with cam 604 and rolls along the surface of cam 604 serving as the follower of the surface of cam 604. Since spring arm assembly is maintained in a specific orientation, as roller 624 follows cam surface the roller 624 exerts a force on cam 604. Depending on the angle of the surface of cam 604 at the point that is in contact with roller 624, the force exerted by roller 624 may exert a rotational force on control sector 600.

In the position depicted in FIG. 6A, the cam 604 is in a neutral, centered position. The roller 624 is disposed in the centering section 606 of cam 604 which comprises a partially concave surface. When cam 604 is disposed in the depicted centered position, roller 624 contacts cam 604 at the turning point or low point of the concave surface which is substantially tangent to a circle centered on point 602. Because the surface of centering area 606 at the neutral point is tangent to the control sector rotation, the force exerted by roller 624 is substantially directed toward the point 602 and exerts little or no rotational force on cam 604 or control sector 600.

Referring now to FIG. 6C, a detailed schematic view of a portion of an embodiment of the improved flight control system is depicted with reference to area A as identified on FIG. 6A. The centering area 606 and the transition from the concave area to the convex areas of area 606 and areas 608 is more clearly visible in this detail view. When control sector 600 rotates in either direction, roller 624 initially contacts the concave area of centering area 606 of cam 604. The orientation of the curvature of the surface of centering area 606 away from the neutral position is not tangent to the rotation of control sector 600. As a result the force exerted by roller 624 may be regarded as two components, one directed toward point 602 and one tangent to the rotation around point 602. The component of the force that is directed toward point 602 has little or no impact on the rotation of cam 604. The component of the force exerted by roller 624 that is tangential to the rotation of cam 604 resists the rotation of cam 604 and control sector 600, and that tends to return the cam 604 to the neutral, centered position. At two points within centering area 606, one on either side of the neutral, centered position, an inflection occurs and the concave cam surface becomes convex, and the centering area 606 extends until the turning point of those convex areas on either side of the neutral point. The slope and profile of the centering area may be symmetrical on opposite sides of the neutral point, or it may be asymmetric as desired for operation of the system. Similarly, the slope and profile of the centering area may be modified to provide more or less centering force at various degrees of rotation. In the depicted embodiment, the centering force peaks in the concave area of centering area 606 and slowly reduces in the convex portions of centering area 606 until it reaches zero at the turning point of the convex area at the edge of centering area 606.

Figure 6B:
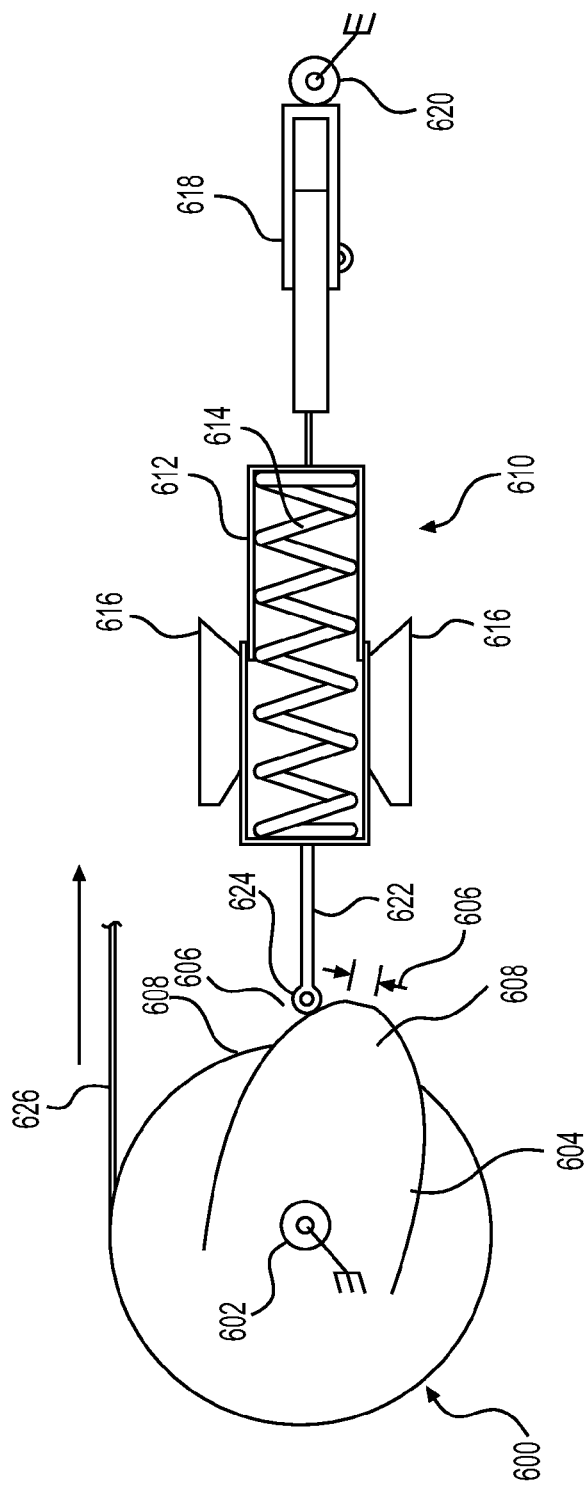
FIG. 6B is a schematic view of an embodiment of the improvement to flight control systems.

Referring now to FIG. 6B, a schematic view of an alternative embodiment of the improved control system is depicted. The control sector 600 is rotated from the neutral position due to pilot or other force applied to the control system. The cam 604 rotates with cam 600 to a non-neutral position. Spring arm assembly 610 is retained in its original position by sleeve 616 but spring 614 has extended and compressed to cause roller arm 622 and roller 624 to follow the surface of cam 604, exerting varying degrees of rotational force on cam 604 and by extension control sector 600 based on the angle of the surface of the cam 604. As the roller 624 passes the edge of centering area 606 the centering rotational force exerted by roller 624 on cam 604 drops to zero. As roller 624 contacts augmentation area 608 of cam 604 the rotational force increases again, but is directed in the other direction and tends to rotate the cam 604 away from the neutral centered position. This rotational force away from center augments the force applied by the pilot and reduces the force necessary from the pilot to maintain or increase the deflection of the control surface attached to control sector 600. The shape and surface angle of the augmentation areas 608 of cam 604 determines the force profile of the augmenting force, and such areas may be convex or flat as desired for the aircraft design. Additional concave areas may be provided at the outer edges of augmentation areas 608 to resist the deflection of the control surfaces by the pilot past a designated safe maximum deflection.

Referring now to FIG. 6C, a detail schematic view of a portion of an embodiment of the improvement to flight control system is depicted. The centering area 606 and the adjacent augmentation areas 608 of cam 604 in area A as shown on FIG. 6A are shown in more detail. The roller 624 on roller arm 622 contacts the surface of the cam 600 on the concave surface of the centering area 606. The centering areas extend to the inflection points of the convex curves of cam 600 on either side of centering area 606. As the cam rotates the roller 624 exerts a force on cam 604 to rotate it back to the position shown in FIG. 6C. The centering force increases in the concave area and begins to decrease as roller 624 enters the convex portion of centering area 606. Once the roller 624 passes the inflection point of the convex area, the roller enters augmentation areas 606 and the force exerted by the roller 624 on cam 604 tends to rotate the cam away from the centered position shown in FIGS. 6A and 6C.

In cases where the necessary authority at high speed is large enough that a jam or failure at the high speed force setting causes the low speed operation of the control surface to become unstable, a mechanical disconnect of the augmentation system can be used to revert the system to a non-augmented arrangement. The disconnect mechanism could consist of a physical disconnect linkage, a clutch, a clamp-up mechanism, or other similar or combined implementations of the mechanisms listed. A summing mechanism could also be used in this circumstance with two actuators. If one actuator or control channel fails in place, then the remaining actuator can still adjust the augmentation system with partial authority sufficient to maintain system stability at all airspeeds. In this configuration the system would be provided with two linear actuators 110 attached serially or otherwise so that either linear actuator could partially adjust the force exerted on the control surfaces by the spring 116.

An electronic monitor system can be used in combination with the augmentation control system to ensure that any faults in the control system, or uncommanded operation of the augmentation system, are captured and alerted to the flight crew. The criticality of the monitoring system is dependent on the aircraft-level results of an augmentation control system failure, and can be designed with sufficient dissimilarity and redundancy to meet those criticality requirements. The monitor system can use position feedback of the augmentation control actuator 110, measured augmentation system output force versus control surface deflection, or a combination of both, compared to a control system schedule based on air data inputs, to ensure that the system is functioning correctly.

In an additional embodiment of the augmentation system includes a damper to tune the damping ratio of the system to avoid underdamping or overdamping of the system. The damper may comprise a damper cartridge that is attached in parallel with spring 102. In some embodiments the dampers may be adjustable to allow the damping to be modified as necessary to reach critical damping of the aircraft control system as modified by the applied force from the augmentation system.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

What is claimed is:

1. A control system for an aircraft comprising:
   a control input member for receiving control input from a pilot of the aircraft, the control input member pivotally attached to the aircraft at a control member mount point;
   a spring;
   a spring arm having a first end and a second end, the first end of the spring arm pivotally attached to the control input member at a spring arm mount point, and the second end of the spring arm attached to the first end of the spring;
   an extendable and retractable preload actuator having a first end and a second end, the first end of the preload actuator attached to the second end of the spring and the second end of the preload actuator pivotally attached to the aircraft at a preload actuator mount point;
   wherein the tension or compression of the spring is adjusted by extending or retracting the preload actuator; and wherein at a neutral position the spring arm mount point is substantially in line with the preload actuator mount point and the control member mount point.

2. The control system of claim 1 further comprising a trim control member pivotally attached to the aircraft at the preload actuator mount point; wherein the second end of the preload actuator is pivotally attached to the trim control member at a trim mount point so that the spring does not substantially exert a rotational force on the control member.

3. The control system of claim 2 wherein the spring arm mount point at a trim position is substantially between the control input mount point and the trim mount point.

4. The control system of claim 3 wherein the control input mount point at a trim position is substantially between the spring arm mount point and the trim mount point.

5. The control system of claim 2 further comprising a centering device for exerting a force on the spring arm towards the neutral position.

6. The control system of claim 5 wherein the centering device comprises a pair of opposed low stiffness springs attached to the preload actuator.

7. The control system of claim 5 wherein the centering device comprises:
 a second pair of cams pivotally attached to the aircraft, wherein the cams are attached to each other by a spring; and
 a pin attached to the control input member and disposed between the cams.

8. The control system of claim 2 wherein the extension of the preload actuator is scheduled based on aircraft performance parameters.

9. The control system of claim 2 wherein the extension of the preload actuator is scheduled based on aircraft control surface settings.

10. The improvement of claim 1 further comprising a damper cartridge attached to the spring arm assembly in parallel with the spring.

11. The improvement of claim 1 further comprising a trim member slidably attached to the aircraft;
 wherein the linear actuator is pivotally attached to the trim member at the third point; and
 wherein the trim member may be moved generally perpendicular to the linear actuator to move the third point so that when the aircraft is in a trimmed position the spring does not substantially exert a rotational force on the control member.

12. The improvement of claim 1 further comprising a monitoring system for determining a failure of the spring arm.

13. The improvement of claim 12 further comprising a mechanical disconnect operated by the monitoring system for disconnecting the spring arm from the control input member.

14. The improvement of claim 1 further comprising a second linear actuator attached between the preload actuator and the spring.

15. The improvement of claim 12 wherein the monitoring system compares a measured augmentation force to a measured control surface deflection to determine a failure of the spring arm assembly.

16. The improvement of claim 12 wherein the monitoring system measures the position of the linear actuator to determine a failure of the spring arm assembly.

17. An improvement to the control system for an aircraft, the aircraft having a control member pivotally mounted at a first point to the aircraft for receiving input from a pilot of the aircraft and translating the input to a control surface of the aircraft, the improvement comprising:
 a spring having a first end and a second end, wherein the first end of the spring is pivotally attached to the control member at a second point radially separated from the first point;
 a linear actuator fixedly attached to the second end of the spring and pivotally attached to the aircraft at a third point, wherein the extension or retraction of the linear actuator alters the tension or compression of the spring;
 wherein when the control surface of the aircraft is in a neutral position, the second point is substantially in a line with the first and third points so that the spring does not substantially exert a rotational force on the control member.

18. The improvement of claim 17 wherein when the control member rotates in response to input received from the pilot the second point is not in a line with the first and third points and the spring exerts a rotational force on the control member.

19. The improvement of claim 18 wherein the rotational force exerted by the spring is adjusted by extending or retracting the linear actuator.

20. The improvement of claim 19 wherein the extension or retraction of the linear actuator is scheduled based on performance parameters of the aircraft or on control surface settings of the aircraft.

21. The improvement of claim 17 further comprising a centering device for exerting a force on the spring arm towards the neutral position.

22. The improvement of claim 21 wherein the centering device comprises a pair of opposed low stiffness springs attached to the linear actuator.

23. The improvement of claim 21 wherein the centering device comprises a pair of cams pivotally attached to the aircraft, wherein the cams are attached to each other by a second spring; and
 a follower attached to the control input member and disposed between the cams.

24. The improvement of claim 17 wherein when the control surface is in a neutral position, the second point is disposed between the first and third points and the spring is a compression spring.

25. The improvement of claim 17 wherein when the control surface is in a neutral position, the first point is disposed between the second and third points and the spring is a tension spring.

26. The improvement of claim 17 wherein when the control surface is in a neutral position, the second point is disposed between the first and third points and the spring is a tension spring.

27. The improvement of claim 17 wherein when the control surface is in a neutral position, the first point is disposed between the second and third points and the spring is a compression spring.

28. The improvement of claim 17 further comprising a trim member pivotally attached to the aircraft at the third point, wherein the linear actuator is pivotally attached to the trim member at a fourth point radially separated from the third point; and
 wherein the trim member may be rotated to maintain the fourth point substantially in a line with the first and second points when the aircraft is in a trimmed position, so that the spring does not substantially exert a rotational force on the control member.

* * * * *

UNITED STATES PATENT AND TRADEMARK OFFICE
CERTIFICATE OF CORRECTION

PATENT NO.         : 9,193,439 B2                           Page 1 of 1
APPLICATION NO.    : 14/195419
DATED              : November 24, 2015
INVENTOR(S)        : Steven G. Hagerott et al.

It is certified that error appears in the above-identified patent and that said Letters Patent is hereby corrected as shown below:

IN THE CLAIMS

At Column 11, line 3, in Claim 1, at the end of the final line before the "." --so that the spring does not substantially exert a rotational force on the control member-- has been inserted.

Signed and Sealed this
Twenty-ninth Day of March, 2016

Michelle K. Lee
*Director of the United States Patent and Trademark Office*